(12) United States Patent
Kuroiwa

(10) Patent No.: US 11,760,149 B2
(45) Date of Patent: Sep. 19, 2023

(54) FLUID SUPPLY DEVICE, VEHICLE HEIGHT ADJUSTMENT DEVICE, AND SADDLE-TYPE VEHICLE

(71) Applicant: Hitachi Astemo, Ltd., Hitachinaka (JP)

(72) Inventor: Naoya Kuroiwa, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 0 days.

(21) Appl. No.: 17/695,314

(22) Filed: Mar. 15, 2022

(65) Prior Publication Data

US 2022/0203798 A1 Jun. 30, 2022

Related U.S. Application Data

(63) Continuation of application No. PCT/JP2020/012616, filed on Mar. 23, 2020.

(51) Int. Cl.
*B60G 17/044* (2006.01)
*B60G 17/08* (2006.01)
(Continued)

(52) U.S. Cl.
CPC ......... *B60G 17/08* (2013.01); *B60G 17/0272* (2013.01); *F16F 9/43* (2013.01);
(Continued)

(58) Field of Classification Search
CPC ............... B60G 17/08; B60G 17/0272; B60G 2202/413; B60G 2300/12; B60G 2400/252; B60G 2500/30; B60G 17/044; F16F 9/43
See application file for complete search history.

(56) References Cited

U.S. PATENT DOCUMENTS 10,550,909 B2* 2/2020 Haugen ............... B60G 13/14
2009/0121398 A1* 5/2009 Inoue ............... B60G 17/0157
267/140.14
(Continued)

FOREIGN PATENT DOCUMENTS

JP 2016160968 A 9/2016
JP 2018144650 A 9/2018

OTHER PUBLICATIONS

International Search Report dated Jun. 9, 2020 for the corresponding International Patent No. PCT/JP2020/012616, 6 pages [English translation attached].
(Continued)

*Primary Examiner* — Toan C To
(74) *Attorney, Agent, or Firm* — Leason Ellis LLP; Edward J. Ellis; Melvin C. Garner

(57) ABSTRACT

The fluid supply device comprises a screw, which has a male thread formed thereon and rotates, and a nut, which has a female thread formed therein that meshes with the male threading and which, by the screw rotating in a first direction, i.e., the circumferential direction, moves towards a first end in the rotation axis direction, and which, by moving with said movement a piston that forms a reservoir chamber, discharges a fluid stored in the reservoir chamber, wherein, if the fluid is discharged and if the screw is not rotating, first surfaces which form the threading of the male screw and second surfaces which form the threading of the female screw are in contact with each other, and second surfaces which form the threading of the male screw and first surfaces which form the threading of the female screw are not in contact with each other.

20 Claims, 9 Drawing Sheets

(51) Int. Cl.
    *B60G 17/027* (2006.01)
    *F16F 9/43* (2006.01)

(52) U.S. Cl.
    CPC .... *B60G 2202/413* (2013.01); *B60G 2300/12* (2013.01); *B60G 2400/252* (2013.01); *B60G 2500/30* (2013.01)

(56) References Cited

U.S. PATENT DOCUMENTS

| | | | |
|---|---|---|---|
| 2010/0032912 A1* | 2/2010 | Inoue | F16F 15/002 |
| | | | 280/5.502 |
| 2010/0200343 A1* | 8/2010 | Kondo | B60G 13/02 |
| | | | 188/267 |
| 2011/0101632 A1* | 5/2011 | Mochizuki | F16F 9/56 |
| | | | 280/6.157 |
| 2019/0001776 A1 | 1/2019 | Murakami et al. | |
| 2021/0381574 A1* | 12/2021 | Smith | F16F 9/466 |
| 2022/0025954 A1* | 1/2022 | Pickett | B62K 25/06 |
| 2022/0396110 A1* | 12/2022 | Oshida | B60G 17/00 |

OTHER PUBLICATIONS

International Written Opinion dated Jun. 9, 2020 for the corresponding International Patent Application No. PCT/JP2020/012616, 3 pages.

* cited by examiner

COMPARATIVE EXAMPLE

FLUID SUPPLY DEVICE, VEHICLE HEIGHT ADJUSTMENT DEVICE, AND SADDLE-TYPE VEHICLE

CROSS REFERENCE TO RELATED APPLICATIONS

This application is a Continuation of International Patent Application No. PCT/JP2020/012616 filed on Mar. 23, 2020, the content of which is incorporated herein by reference in its entirety.

FIELD OF THE INVENTION

The present invention relates to a fluid supply device, a vehicle height adjustment device, and a saddle-type vehicle.

BACKGROUND OF THE INVENTION

In recent years, suggested is a device configured to adjust a height (vehicle height) of a vehicle main body of a vehicle so as to adjust a posture of the vehicle, for example.

For example, a front fork, a rear suspension, and a control device described in JP 2018-144650 A are examples of a device for adjusting a vehicle height of a two-wheeled motor vehicle.

In addition, a device described in JP 2016-160968 A includes a vehicle height adjustment suspension having a support member configured to support one end of a suspension spring and a jack chamber, and configured to change a vehicle height of a vehicle body by moving the support member by supply of a liquid to the jack chamber. Further, the device described in JP 2016-160968 A includes a hydraulic pump, which has a pump-side oil chamber connected to the jack chamber via an oil passage and variable in capacity by movement of a pump-side piston and is configured to supply the liquid from the pump-side oil chamber to the jack chamber, a motor configured to drive the pump-side piston, and a control device configured to control drive of the motor.

CITATION LIST

Patent Literature

PTL 1: JP 2018-144650 A
PTL 2: JP 2016-160968 A

In the configuration where a fluid is supplied to the jack chamber by a piston (pump-side piston) configured to move due to the drive of the motor, as in the device described in JP 2016-160968 A, a following configuration is considered as a mechanism configured to convert a rotational drive force of the motor into linear motion of the piston. That is, a consideration is considered which includes a rotation member configured to rotate by a rotational drive force of the motor and having a male screw formed on an outer peripheral surface thereof and a moving member having a female screw formed thereon in mesh with the male screw and configured to move linearly in a rotation axis direction, and therefore, to apply, to the piston, a force in the rotation axis direction. In such a configuration, when the piston moves so as to supply the fluid to the jack chamber, the male screw of the rotation member receives a force, which is caused by a pressure of the fluid and in a direction opposite to a moving direction of the piston in the rotation axis direction, via the female screw of the moving member, and also receives a reactive force in the opposite direction, which is caused due to rotation of the rotation member, from the female screw. For this reason, threads of the male screw of the rotation member may be worn or chipped, and therefore, abrasion powders or debris may be generated. When the abrasion powders or debris generated in this way are caught between the threads of the male screw and the threads of the female screw, there are concerns that the male screw and the female screw may be stuck or the threads may be chipped. From standpoints of maintaining a state in which the piston can be easily moved, and the like, it is desired to suppress the occurrence of sticking between the male screw and the female screw and the occurrence of chipping of the threads.

An object of the present invention is to provide a fluid supply device and the like capable of suppressing occurrence of sticking between a male screw and a female screw and occurrence of chipping of a thread.

SUMMARY OF THE INVENTION

In the below, the present disclosure is described.

One aspect of the present disclosure is a fluid supply device including a rotation member having a male screw formed thereon and configured to rotate; and a moving member having a female screw formed thereon in mesh with the male screw, and configured to move toward a first end-side in a rotation axis direction of the rotation member as the rotation member rotates in a first direction that is a circumferential direction, to drive, by this movement, a piston configured to form a reservoir chamber, and to discharge a fluid stored in the reservoir chamber, in which, at least, when the fluid is discharged or when the rotation member is not rotating, a surface on the first end-side, which forms a thread of the male screw, and a surface on a second end-side, which forms a thread of the female screw, are in contact with each other, and a surface on the second end-side, which forms the thread of the male screw, and a surface on the first end-side, which forms the thread of the female screw, are not in contact with each other.

Here, the male screw and the female screw may be trapezoidal screws.

In addition, a magnitude of an angle formed between the surface on the second end-side, which forms the thread of the male screw, and the rotation axis direction may be smaller than a magnitude of an angle formed between the surface on the first end-side, which forms the thread of the female screw, and the rotation axis direction.

In addition, the rotation member may have a communication passage configured to communicate with a portion positioned between the surface on the second end-side, which forms the thread of the male screw, and the surface on the first end-side, which forms the thread of the female screw, and provided on a more inner side in a radial direction of rotation of the rotation member than the male screw.

In addition, the moving member may have a communication passage configured to communicate with a portion positioned between the surface on the second end-side, which forms the thread of the male screw, and the surface on the first end-side, which forms the thread of the female screw, and provided on a more outer side in a radial direction of rotation of the rotation member than the female screw.

Another aspect of the present disclosure is a vehicle height adjustment device including the fluid supply device according to the above-described aspect and a spring whose load is adjusted using the fluid supplied by the fluid supply device.

Another aspect of the present disclosure is a saddle-type vehicle including a vehicle main body; a front wheel arranged on a front side of the vehicle main body and a rear wheel arranged on a rear side of the vehicle main body; a first suspension device arranged between the vehicle main body and the front wheel; a second suspension device arranged between the vehicle main body and the rear wheel and having a spring; and a vehicle height adjustment device configured to adjust a load of the spring of the second suspension device by using the fluid supplied by the fluid supply device according to the above-described aspect.

According to the present invention, it is possible to suppress occurrence of sticking between the male screw and the female screw and occurrence of chipping of the threads.

DETAILED DESCRIPTION OF THE INVENTION

Hereinafter, embodiments of the present invention will be described in detail with reference to the accompanying drawings. Note that, the embodiments described below are examples of the embodiment of the present invention, and the present invention is not limited to the embodiments described below.

First Embodiment

Figure 1:
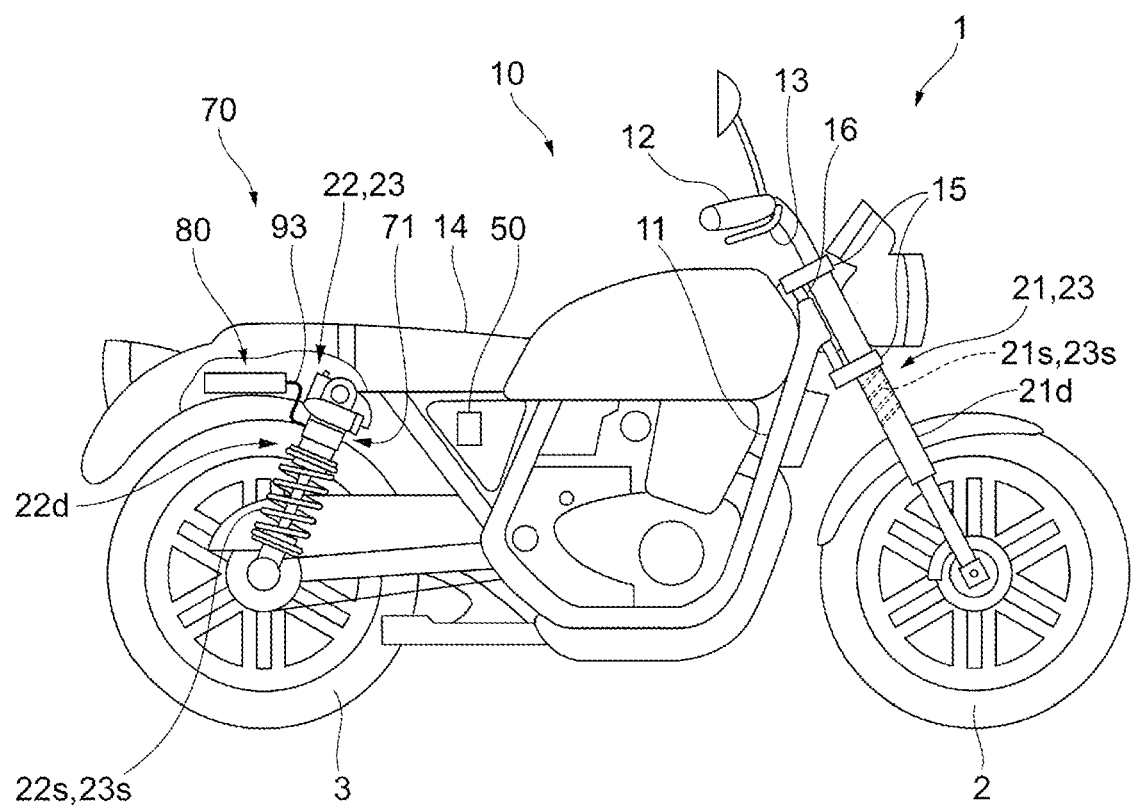
FIG. 1 shows an example of a schematic configuration of a two-wheeled motor vehicle 1 according to a first embodiment.
Figure 1:
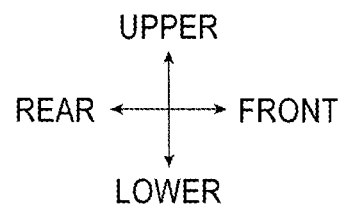

FIG. 1 shows an example of a schematic configuration of a two-wheeled motor vehicle 1 according to a first embodiment.

Figure 2:
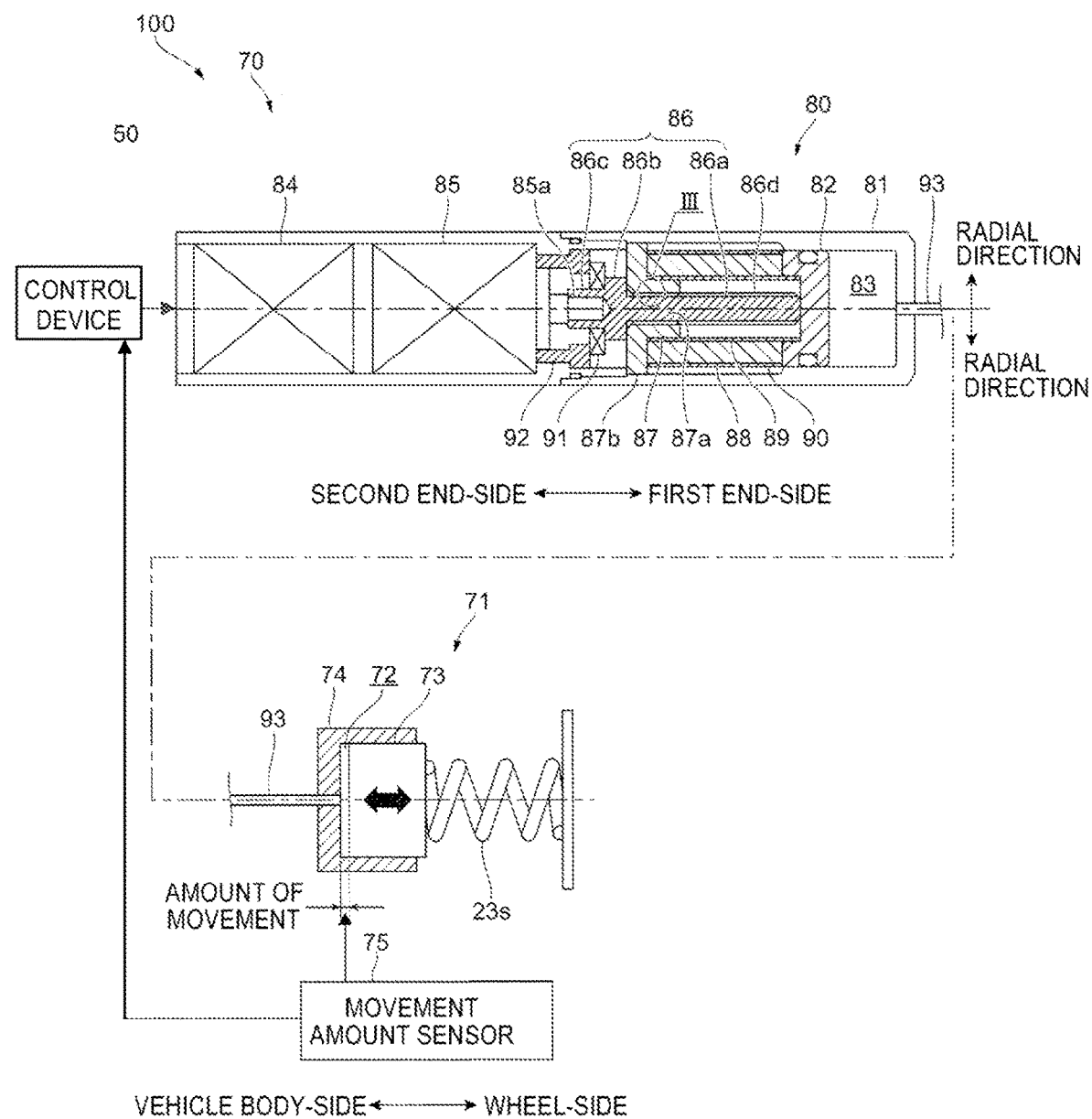
FIG. 2 shows an example of a schematic configuration of a vehicle height adjustment device 100.

FIG. 2 shows an example of a schematic configuration of a vehicle height adjustment device 100.

The two-wheeled motor vehicle 1 as an example of the straddle-type vehicle has a front wheel 2, which is a wheel on a front side, and a rear wheel 3, which is a wheel on a rear side. In addition, the two-wheeled motor vehicle 1 includes a vehicle body frame 11 forming a skeleton of the two-wheeled motor vehicle 1, a handle 12, a brake lever 13, and a vehicle main body 10 having a seat 14. In descriptions below, the front wheel 2 and the rear wheel 3 may also be collectively referred to as 'wheel', and the vehicle main body 10 may also be referred to as 'vehicle body'.

In addition, the two-wheeled motor vehicle 1 includes front forks 21 that are a first suspension device configured to connect the front wheel 2 and the vehicle body 10 each other. Further, the two-wheeled motor vehicle 1 includes two brackets 15 configured to hold the two front forks 21 arranged on each of left and right sides of the front wheel 2, and a shaft 16 arranged between the two brackets 15. The shaft 16 is rotatably supported by the vehicle body frame 11. The front fork 21 has a suspension spring 21s configured to absorb an impact applied to the front wheel 2 from a road surface or the like, and a damping device 21d configured to attenuate vibration of the suspension spring 21s.

In addition, the two-wheeled motor vehicle 1 includes rear suspensions 22, which are a second suspension device configured to connect the rear wheel 3 and the vehicle body 10 each other, provided on each of left and right sides of the rear wheel 3. The rear suspension 22 has a suspension spring 22s configured to absorb an impact applied to the rear wheel 3 from a road surface or the like, and a damping device 22d configured to attenuate vibration of the suspension spring 22s.

Note that, in descriptions below, the front fork 21 and the rear suspension 22 may also be collectively referred to as 'suspension device 23'. In addition, the suspension spring 21s and the suspension spring 22s may also be collectively referred to as 'spring 23s'.

Further, the two-wheeled motor vehicle 1 includes an adjustment unit 70 configured to adjust a height of the vehicle main body 10, in other words, a vehicle height by changing an initial load (preload) that is applied to the spring 23s.

Further, the two-wheeled motor vehicle 1 includes a control device 50 configured to control the initial load of the spring 23s.

(Adjustment Unit 70)

The adjustment unit 70 includes a jack unit 71 provided to the suspension device 23 and configured to adjust a length of the spring 23s, and a supply device 80 as an example of a fluid supply device configured to supply oil to a jack chamber 72 of the jack unit 71.

As shown in FIG. 2, the jack unit 71 has a support member 73 configured to support an end portion of the spring 23s on the vehicle body-side, and a forming member 74 configured to form the jack chamber 72 together with the support member 73, and is configured to adjust a length of the spring 23s as the support member 73 moves according to an amount of oil in the jack chamber 72. It may be exemplified that the support member 73, the jack chamber 72, and the forming member 74 are implemented by the support member of the rear suspension or the front fork, the jack chamber and the hydraulic jack described in JP 2018-144650 A, respectively.

In addition, the jack unit 71 includes a movement amount sensor 75 configured to detect an amount of movement of the support member 73. An amount of movement of the support member 73 that is detected by the movement amount sensor 75 is an amount of movement when an amount of movement at a time when the support member 73 is located at a reference position is 0. The reference position is a position of the support member 73 when the oil in the jack chamber 72 is 0. As the movement amount sensor 75, for example, a sensor may be exemplified in which a coil is wound on an outer peripheral surface of the forming member 74, the support member 73 is made of a magnetic material, and an amount of movement of the support member 73 is detected using an inductance of the coil changing according to movement of the support member 73 with respect to the forming member 74.

As shown in FIG. 2, the supply device 80 includes a housing 81 configured to store oil and a circular cylinder-shaped piston 82 configured to slide in the housing 81. A reservoir chamber 83 configured to store oil is formed in a space surrounded by an inner surface of the housing 81 and the piston 82.

In addition, the supply device 80 includes a motor 84, a speed reducer 85 configured to reduce a rotation speed of the motor 84, and a screw 86 connected to an output shaft 85a of the speed reducer 85.

As the motor 84, a direct current (DC) motor with a brush may be exemplified. Drive of the motor 84 is controlled by the control device 50. As the speed reducer 85, a planetary speed reducer using a well-known planetary gear mechanism may be exemplified.

The screw 86 has a first portion 86a, the second portion 86b, and a third portion 86c, which are three circular cylinder-shaped portions having different diameters, sequentially from a first end-side (right side in FIG. 2) to a second end-side (left side in FIG. 2) in a rotation axis direction. An outer diameter of the second portion 86b is larger than an outer diameter of the first portion 86a and an outer diameter of the third portion 86c. A male screw 86d is formed on an outer peripheral surface of the first portion 86a. The output shaft 85a of the speed reducer 85 is fitted on an inner side of the third portion 86c in a radial direction (vertical direction on the drawing sheet of FIG. 2). Thereby, the screw 86 is configured to rotate integrally with the output shaft 85a of the speed reducer 85. The screw 86 is an example of the rotation member having the male screw 86d formed thereon and configured to rotate.

In addition, the supply device 80 includes a nut 87 as an example of the moving member having a female screw 87a formed thereon in mesh with the male screw 86d formed on the first portion 86a of the screw 86 and configured to move in the rotation axis direction as the screw 87 rotates. The nut 87 has a flange 87b at an end portion on a second end-side.

Further, the supply device 80 includes an interposition member 88 interposed between the flange 87b of the nut 87 and the piston 82, and a cylindrical collar 89 arranged on an inner side of the interposition member 88 and on an outer side of the nut 87, and a cylindrical collar 90 arranged on an outer side of the interposition member 88. The interposition member 88 is an elastic member, and is sandwiched between the piston 82 and the flange 87b of the nut 87 in a state of being elastically deformed by being pressed by the piston 82 receiving a force from oil. Thereby, the interposition member 88 suppresses the nut 87 from rotating as the screw 86 rotates.

In addition, the supply device 80 includes a bearing 91 configured to rotatably support the screw 86, and a support member 92 configured to support the bearing 91. The bearing 91 is arranged between the support member 92 and the second portion 86b of the screw 86.

The piston 82, the motor 84, the speed reducer 85, the screw 86, the nut 87, the interposition member 88, the collar 89, the collar 90, the bearing 91, and the support member 92 described above are accommodated in the housing 81.

The supply device 80 includes a hose 93 mounted to the housing 81, provided between the reservoir chamber 83 and the jack chamber 72 of the jack unit 71 and configured to allow oil to flow between the reservoir chamber 83 and the jack chamber 72.

In the adjustment unit 70 configured as described above, the shaft of the motor 84 of the supply device 80 rotates in a first direction, which is a circumferential direction, so that the screw 86 rotates in the first direction and the nut 87 moves toward the first end-side in the rotation axis direction. As the nut 87 moves, the collar 89, the collar 90, and the interposition member 88 receive a force from the second end-side toward the first end-side in the rotation axis direction, thereby moving the piston 82 toward the first end-side. Thereby, the piston 82 discharges the oil from the reservoir chamber 83. Then, the oil is supplied into the jack chamber 72 via the hose 93. As a result, the support member 73 moves toward the wheel-side (right side in FIG. 2) with respect to the forming member 74, in other words, the amount of movement of the support member 73 from the reference position increases, and the spring length of the spring 23s is shortened.

When the spring length of the spring 23s is shortened, a spring force by which the spring 23s pushes the support member 73 increases, as compared to a spring force before the support member 73 moves with respect to the forming member 74. As a result, even when a force acts on the wheel-side from the vehicle body, an initial load that does not change relative positions of the vehicle body and the wheel increases. In such a case, when the same force acts on the wheel-side from the vehicle body-side, a sinking amount of the suspension device 23 (change in distance between the vehicle body and the wheel) decreases. For this reason, when the spring length of the spring 23s is shortened due to the movement of the support member 73 with respect to the forming member 74, a height of the vehicle main body 10 increases (vehicle height increases), as compared to a height before the support member 73 moves with respect to the forming member 74.

On the other hand, when the shaft of the motor 84 of the supply device 80 rotates in a second direction in the circumferential direction, which is an opposite direction to the first direction, the screw 86 rotates in the second direction. Then, the force from the piston 82 that receives the force of the oil in the reservoir chamber 83 acts on the flange 87b of the nut 87 via the collar 89, the collar 90, and the interposition member 88, and the nut 87 moves toward the second end-side in the rotation axis direction. As the nut 87 moves toward the second end-side, a volume of the reservoir chamber 83 increases. Thereby, the support member 73 discharges the oil in the jack chamber 72, and this oil is supplied to the reservoir chamber 83. As a result, the support member 73 moves toward the vehicle body-side (left side in FIG. 2) with respect to the forming member 74, in other words, the amount of movement of the support member 73 from the reference position decreases, and the spring length of the spring 23s is lengthened.

When the spring length of the spring 23s is lengthened, the spring force by which the spring 23s pushes the support member 73 decreases, as compared to the spring force before the support member 73 moves with respect to the forming member 74. As a result, when the same force acts on the wheel-side from the vehicle body-side, the sinking amount of the suspension device 23 increases. For this reason, when the spring length of the spring 23s is lengthened due to the movement of the support member 73 with respect to the forming member 74, the height of the vehicle main body 10 decreases (vehicle height decreases), as compared to the height before the support member 73 moves with respect to the forming member 74.

The vehicle height adjustment device 100 configured to adjust the vehicle height of the two-wheeled motor vehicle 1 is constituted by the adjustment unit 70 configured as described above, the control device 50, and the like.

(Screw 86 and Nut 87)

Figure 3:
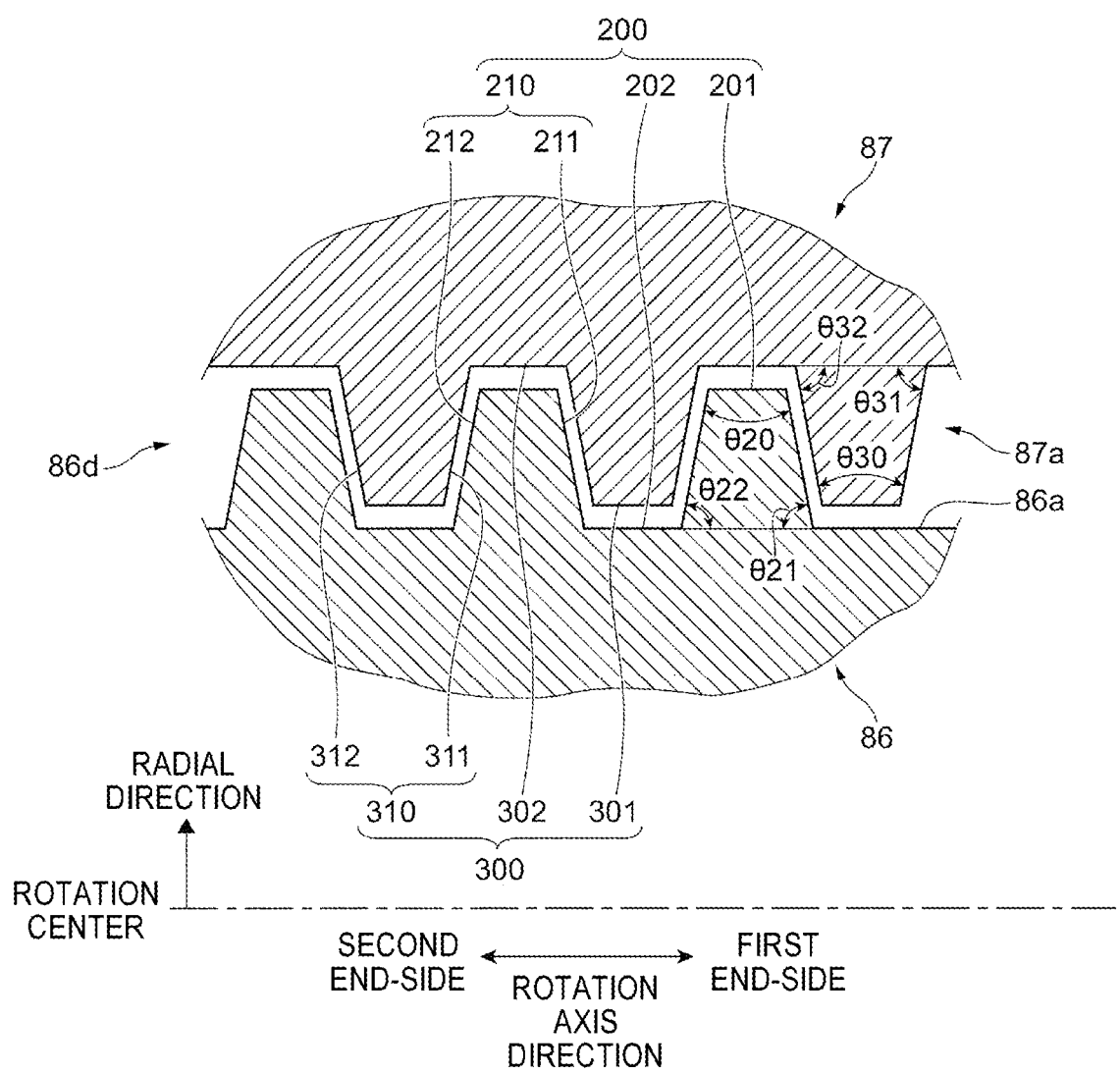
FIG. 3 shows an example of shapes of a male screw 86d of a screw 86 and a female screw 87a of a nut 87.

FIG. 3 shows an example of shapes of the male screw 86d of the screw 86 and the female screw 87a of the nut 87. FIG. 3 is an enlarged view of a III part of FIG. 2. Note that, as described later, a first surface 211 of the screw 86 and a second surface 312 of the nut 87 are actually in contact with each other. However, for convenience, in order to make it easy to understand the shapes of the screw 86 and the nut 87, FIG. 3 shows a state in which the surfaces are not in contact with each other.

The male screw 86d of the screw 86 and the female screw 87a of the nut 87 are trapezoidal screws. In addition, the male screw 86d and the female screw 87a are right-handed screws.

The male screw 86d of the screw 86 has a plurality of threads 200. The thread 200 has a top surface 201, a bottom surface 202, and flanks 210 that are surfaces connecting the top surface 201 and the bottom surface 202 each other. The two flanks 210 forming one thread 200 are constituted by a first surface 211 located on the first end-side in the rotation axis direction (hereinafter, also referred to as 'axis direction') and a second surface 212 located on the second end-side in the axis direction. A magnitude of a first angle θ21, which is an angle formed between the first surface 211 and the rotation axis direction, and a magnitude of a second angle θ22, which is an angle formed between the second surface 212 and the rotation axis direction, are the same. Note that, a magnitude of an angle obtained by adding an angle θ20 of the thread 200, which is an angle formed between the first surface 211 and the second surface 212, the first angle θ21 and the second angle θ22 is 180 degrees.

The male screw 87a the screw 87 has a plurality of threads 300. The thread 300 has a top surface 301, a bottom surface 302, and flanks 310 that are surfaces connecting the top surface 301 and the bottom surface 302 each other. The two flanks 310 forming one thread 300 are constituted by a first surface 311 as an example of a surface located on the first end-side in the rotation axis direction and a second surface 312 as an example of a surface located on the second end-side in the axis direction. A magnitude of a first angle θ31, which is an angle formed between the first surface 311 and the rotation axis direction, and a magnitude of a second angle θ32, which is an angle formed between the second surface 312 and the rotation axis direction, are the same. Note that, a magnitude of an angle obtained by adding an angle θ30 of the thread 300, which is an angle formed between the first surface 311 and the second surface 312, the first angle θ31 and the second angle θ32 is 180 degrees.

The magnitude of the angle θ20 and the magnitude of the angle θ30 are the same, and the magnitude of the first angle θ21, the magnitude of the second angle θ22, the magnitude of the first angle θ31, and the magnitude of the second angle θ32 are the same.

Figure 4:
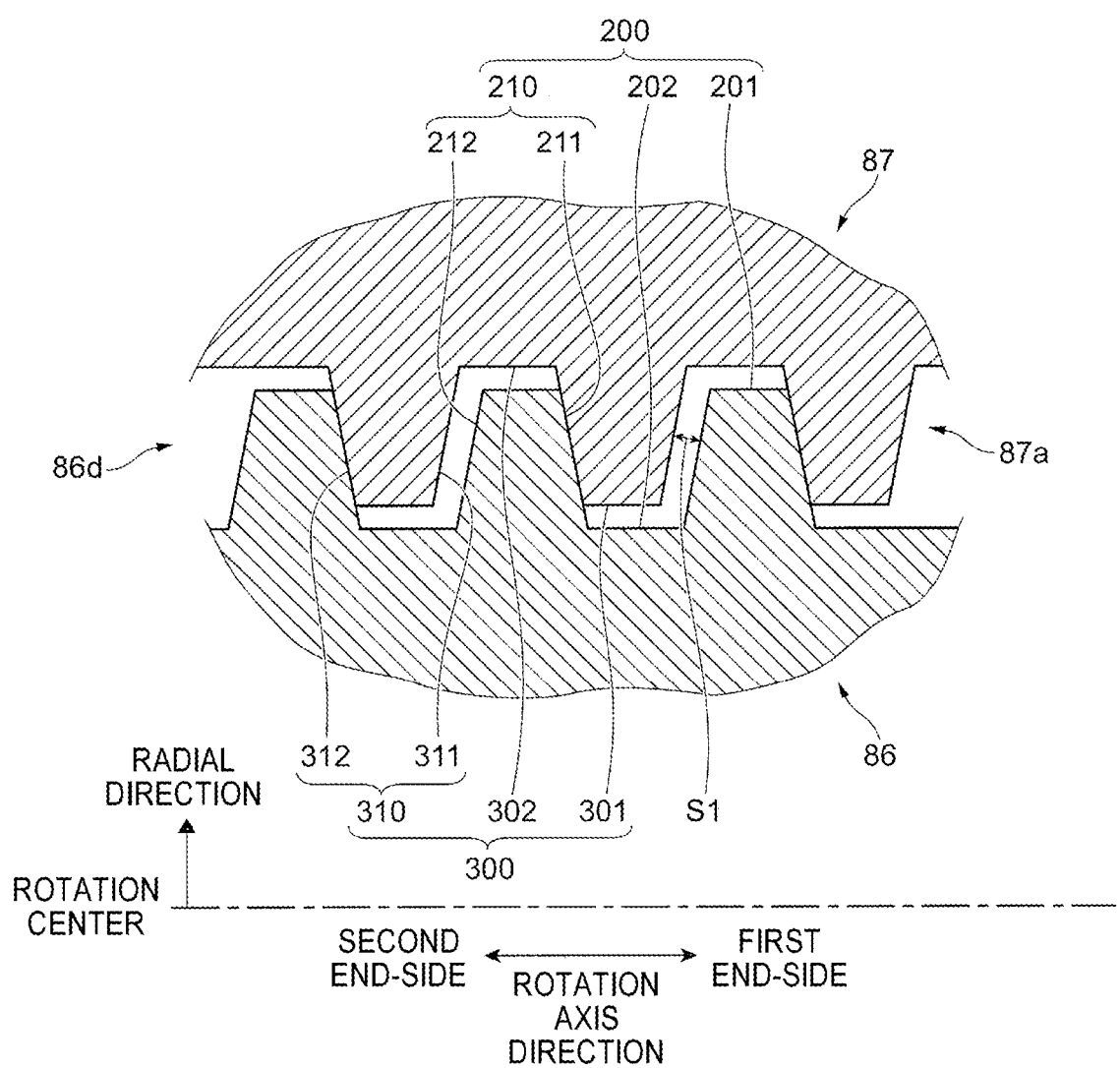
FIG. 4 shows an example of a state of threads 200 and threads 300 when the screw 86 is not rotating.

FIG. 4 shows an example of a state of the threads 200 and the threads 300 when the screw 86 is not rotating.

A force facing from the first end-side toward the second end-side in the axis direction always acts on the nut 87 due to a pressure of the oil in the reservoir chamber 83 (which may be hereinafter referred to as 'hydraulic pressure'). For this reason, for example, when the screw 86 is not rotating, the first surface 211 of the screw 86 and the second surface 312 of the nut 87 are in contact with each other, and the second surface 212 of the screw 86 and the first surface of the nut 87 are not in contact with each other. That is, a gap S1 is formed between the second surface 212 of the screw 86 and the first surface 311 of the nut 87.

Figure 5:
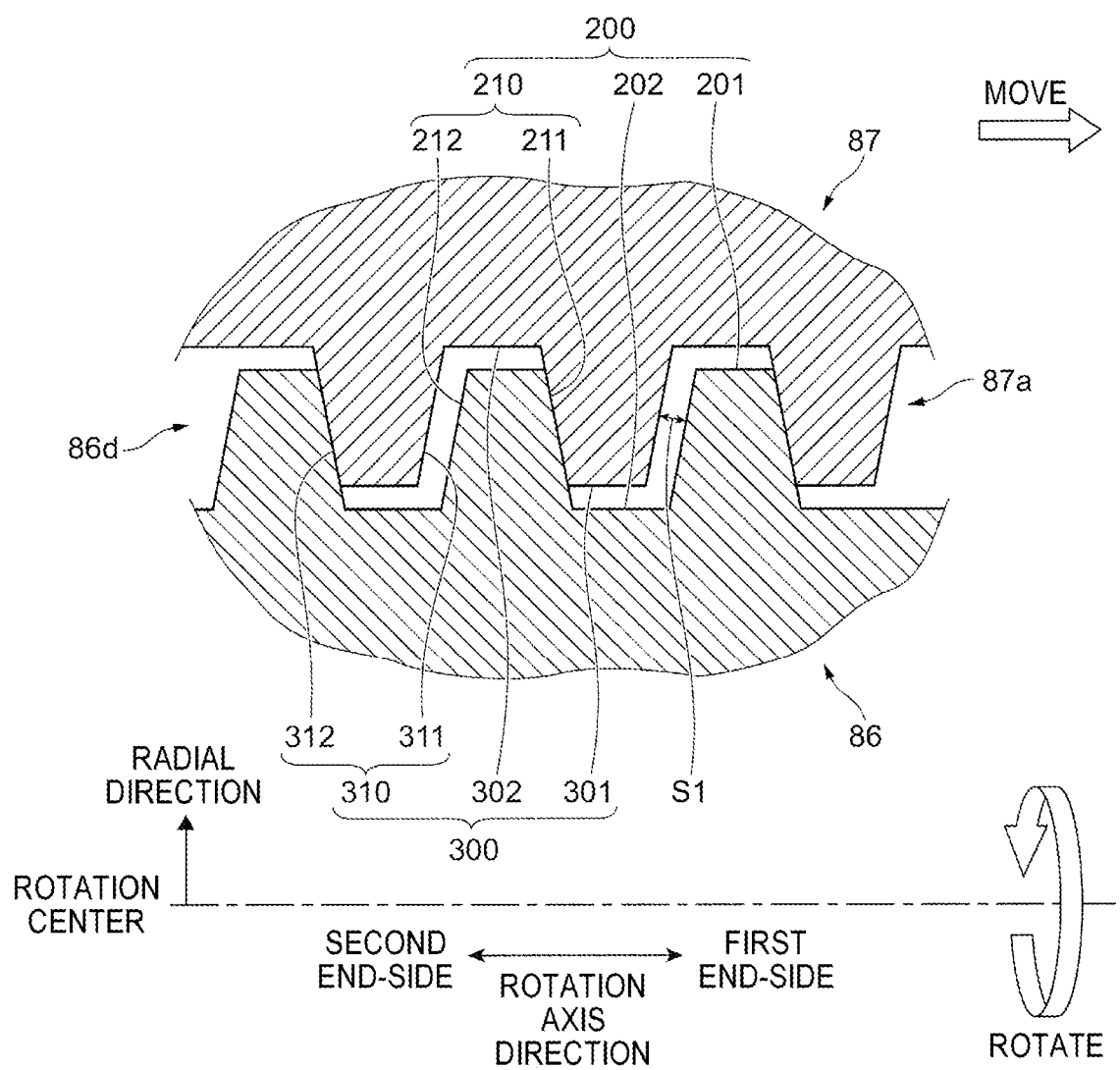
FIG. 5 shows an example of a state of the threads 200 and the threads 300 when the screw 86 is rotating in a first direction.

FIG. 5 shows an example of a state of the threads 200 and the threads 300 when the screw 86 is rotating in the first direction, which is a circumferential direction.

When the screw 86 rotates in the first direction, the first surface 211 of the screw 86 comes into contact with the second surface 312 of the nut 87, so that a force facing from the second end-side toward the first end-side in the axis direction acts on the nut 87. That is, when the screw 86 is rotating in the first direction, the first surface 211 of the screw 86 and the second surface 312 of the nut 87 are in contact with each other, and the second surface 212 of the screw 86 and the first surface of the nut 87 are not in contact with each other. That is, the gap S1 is formed between the second surface 212 of the screw 86 and the first surface 311 of the nut 87.

Figure 6:
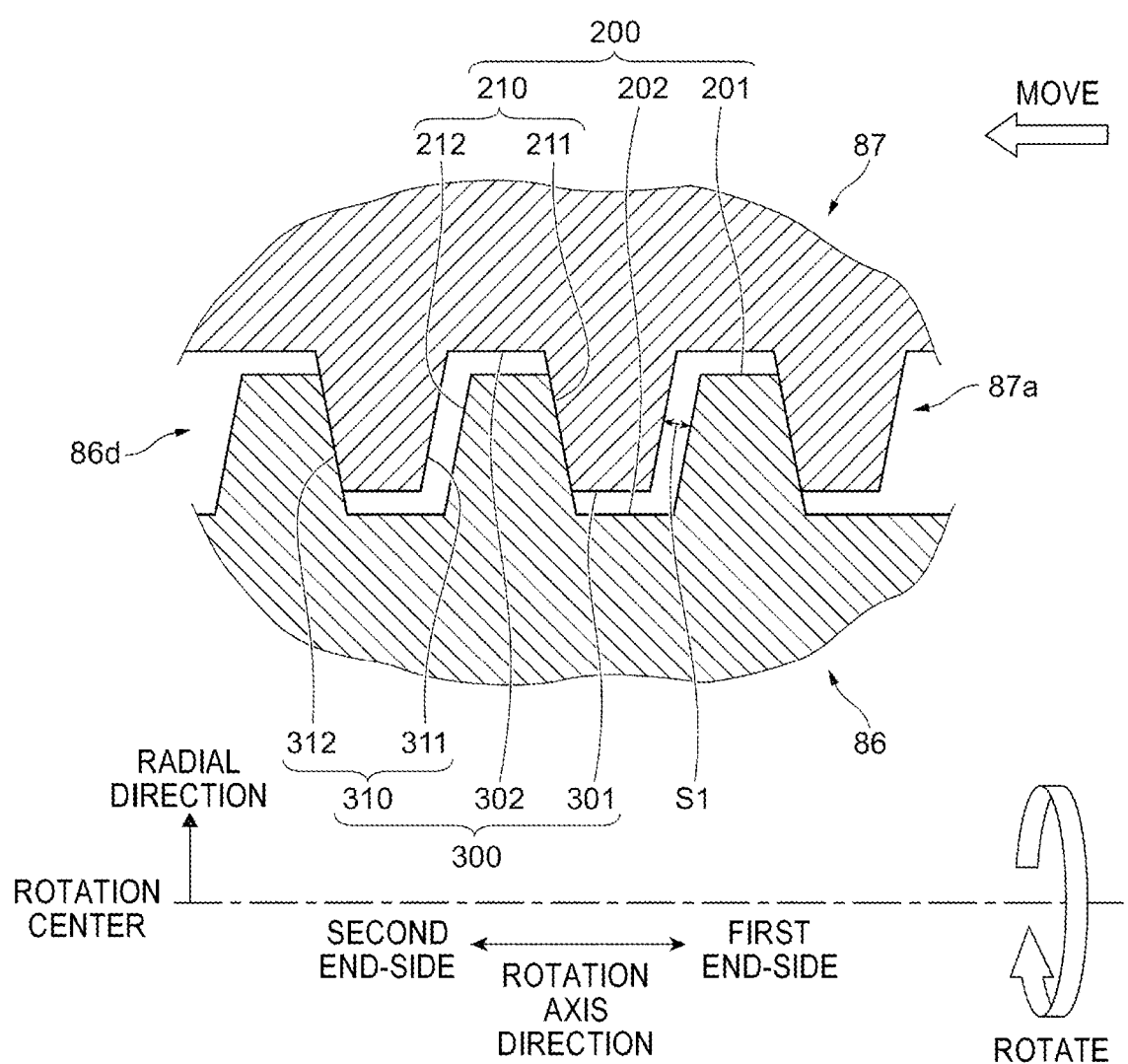
FIG. 6 shows an example of a state of the threads 200 and the threads 300 when the screw 86 is rotating in a second direction.

FIG. 6 shows an example of a state of the threads 200 and the threads 300 when the screw 86 is rotating in the second direction, which is a circumferential direction and is an opposite direction to the first direction.

When the screw 86 rotates in the second direction, the first surface 211 of the screw 86 moves toward the second end-side with respect to the second surface 312 of the nut 87. Since the hydraulic pressure always acts on the nut 87, the nut 87 moves toward the second end-side in the axis direction. At this time, the nut 87 moves toward the second end-side while the first surface 211 of the screw 86 and the second surface 312 of the nut 87 are in contact with each other, whereas the second surface 212 of the screw 86 and the first surface of the nut 87 are not in contact with each other and the gap S1 is formed between the second surface 212 and the first surface 311.

In this way, in the supply device 80, all the time, the first surface 211 of the screw 86 and the second surface 312 of the nut 87 are in contact with each other, and the second surface 212 of the screw 86 and the first surface 311 of the nut 87 are not in contact with each other. That is, the gap S1 is formed between the second surface 212 of the screw 86 and the first surface 311 of the nut 87.

When the screw 86 is not rotating, a contact pressure is generated between the first surface 211 of the screw 86 and the second surface 312 of the nut 87 due to the hydraulic pressure. In addition, when the screw 86 is rotating in the first direction, the rotation of the screw 86 moves the nut 87 toward the first end-side, so that a large contact pressure is generated between the first surface 211 of the screw 86 and the second surface 312 of the nut 87. For this reason, there is a concern that an end portion of the top surface 201 of the thread 200 on the first surface 211-side may be worn. Alternatively, there is a concern that the end portion of the top surface 201 of the thread 200 on the first surface 211-side may be chipped. As a result, there is a concern that abrasion powders or debris may be generated from the end portion of the top surface 201 of the thread 200 on the first surface 211-side.

Figure 7:
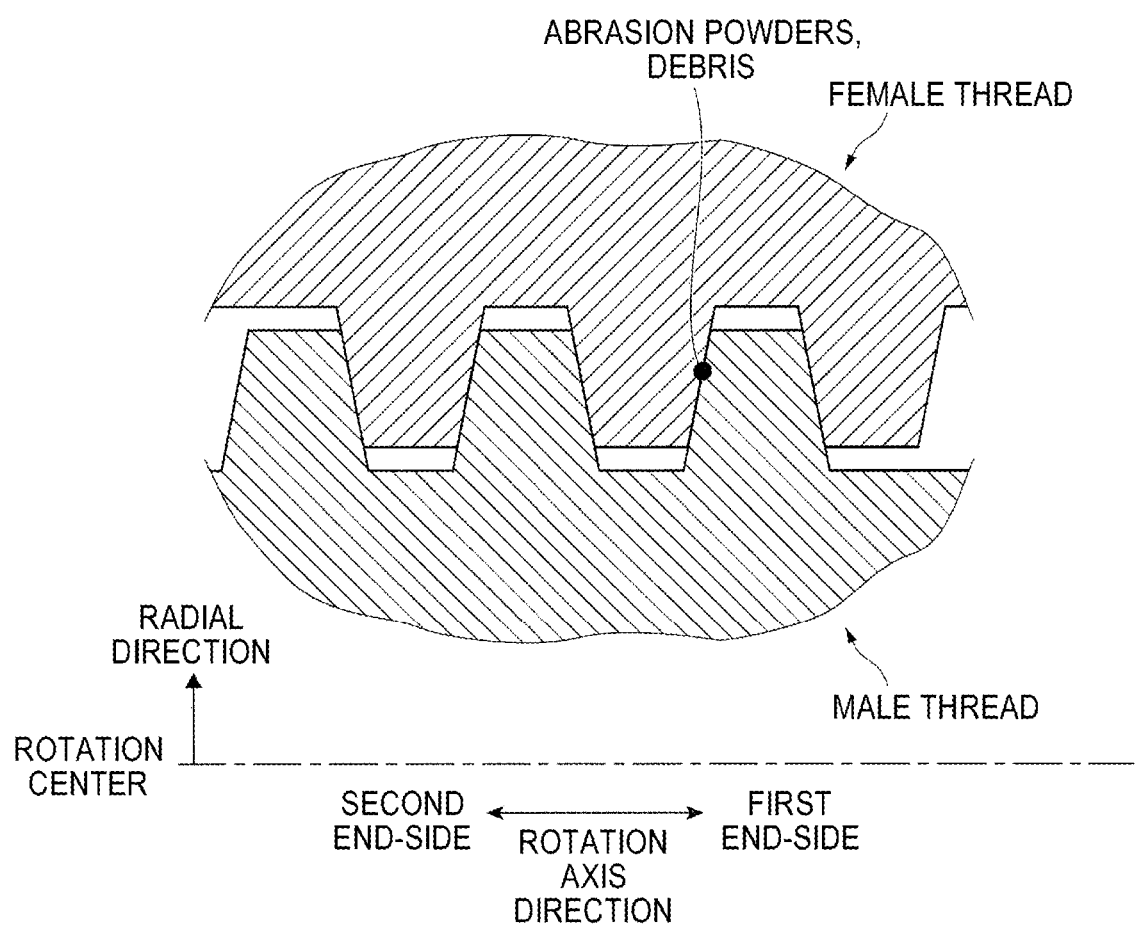
FIG. 7 shows an example of a meshing portion between a male screw and a female screw of trapezoidal screws according to Comparative Example.

FIG. 7 shows an example of a meshing portion between a male screw and a female screw of trapezoidal screws according to Comparative Example.

In the trapezoidal screws according to Comparative Example, the male screw and the female screw have the same grade. For this reason, a gap between a flank of a thread of the male screw and a flank of a thread of the female screw is 0, or is set to 0.2 (mm) or smaller even if it is not 0. In such a case, as shown in FIG. 7, abrasion powders or debris is caught between the flank of the male screw on the second end-side and the flank of the female screw on the first end-side, so that sticking occurs between the male screw and the female screw or the threads may be chipped.

In contrast, in the screw 86 and the nut 87 according to the first embodiment, when the screw 86 is not rotating and when the screw 86 is rotating, a minimum value of the gap S1 formed between the second surface 212 of the screw 86 and the first surface of the nut 87 is set to be larger than a gap according to Comparative Example. That is, the minimum value of the gap S1 is set larger than 0.2 (mm). In addition, it may be exemplified that the minimum value of the gap S1 is set to 10% or more and 30% or less of a size of the top surface 201 in the axis direction. Thereby, even if abrasion powders or debris is generated, the abrasion powders or debris is likely to stay in the gap S1. As a result, it is difficult for abrasion powders or debris to get caught between the thread 200 of the male screw 86d and the thread 300 of the female screw 87a, so that occurrence of sticking between the male screw 86d and the female screw 87a or occurrence of chipping of the thread 200 or the thread 300 is suppressed. More preferably, the minimum value of the gap S1 is set to be larger than a maximum value of abrasion powders or debris estimated to be generated for the thread 200. Thereby, the occurrence of sticking between the male screw 86d and the female screw 87a and the occurrence of chipping of the thread 200 or the thread 300 are more reliably suppressed.

Further, the supply device 80 is configured such that, even when abrasion powders or debris is generated, the movement of the nut 87 causes the abrasion powders or debris to pass through the gap S1 and a gap between the top surface 201 of the thread 200 and the bottom surface 302 of the thread 300 and to be discharged to an outside of the nut 87. Thereby, the occurrence of sticking between the male screw 86d and the female screw 87a and the occurrence of chipping of the thread 200 or the thread 300 are suppressed.

In the above descriptions, the form in which the male screw 86d of the screw 86 and the female screw 87a of the nut 87 are trapezoidal screws has been exemplified. However, the present invention is not limited thereto. The male screw of the rotation member and the female screw of the moving member may have other shapes such as a triangular screw. However, from a standpoint of making it easy to achieve both the strength of the screw thread 200 and the securing of the size of the gap S1, the male screw of the rotation member and the female screw of the moving member are preferably trapezoidal screws.

In addition, the supply device 80 is a device configured to supply the oil as a fluid to the jack chamber 72 of the jack unit 71. However, the fluid is not limited to oil. As the fluid, a liquid other than oil may also be used, or a gas such as air may also be used.

Second Embodiment

Figure 8:
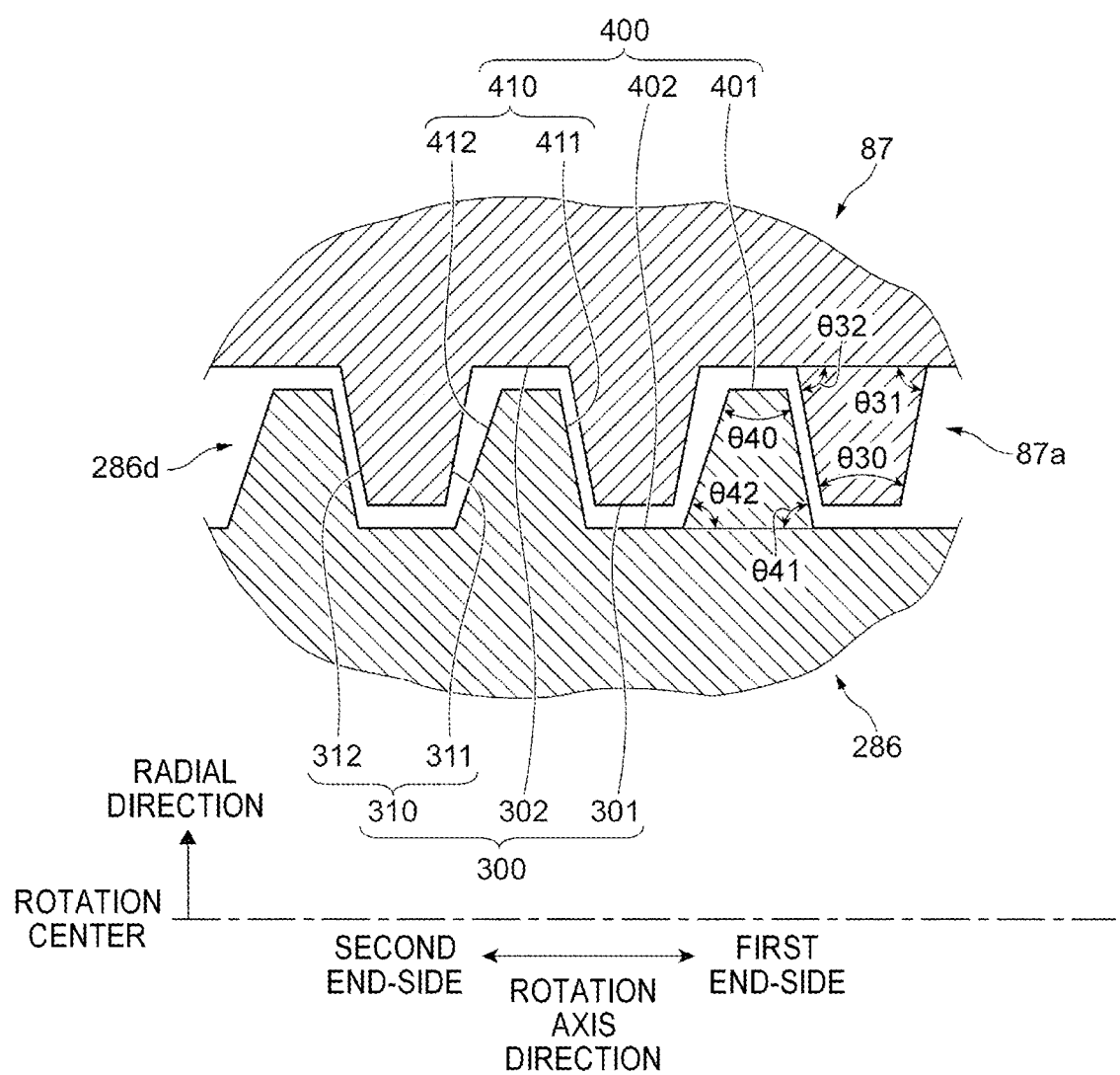
FIG. 8 shows an example of shapes of a male screw 286d of a screw 286 and a female screw 87a of a nut 87 according to a second embodiment.

FIG. 8 shows an example of a male screw 286d of a screw 286 and a female screw 87a of a nut 87 according to a second embodiment. As described later, a first surface 411 of the screw 286 and the second surface 312 of the nut 87 are actually in contact with each other. However, for convenience, in order to make it easy to understand the shapes of the screw 286 and the nut 87, FIG. 8 shows a state in which the surfaces are not in contact with each other.

The screw 286 according to the second embodiment has a different shape of a thread 400 of the male screw 286d from the screw 86 according to the first embodiment. In the below, differences from the first embodiment are described. In the first embodiment and the second embodiment, the same parts are denoted with the same reference signs, and the detailed descriptions thereof are omitted.

The thread 400 has a top surface 401, a bottom surface 402, and flanks 410 that are surfaces connecting the top surface 401 and the bottom surface 402 each other. The two flanks 410 forming one thread 400 are constituted by a first surface 411 located on the first end-side in the axis direction and a second surface 412 located on the second end-side. A length of the bottom surface 402 in the axis direction is the same as a length of the bottom surface 202 in the axis direction, and a length of the top surface 401 in the axis direction is smaller than a length of the top surface 201 in the axis direction. In addition, a magnitude of an angle θ42 formed between the second surface 412 and the rotation axis direction is set to be smaller than a magnitude of an angle θ41 formed between the first surface 411 and the rotation axis direction. The magnitude of the first angle θ41, the magnitude of the first angle θ31 and the magnitude of the second angle θ32 are the same. A magnitude of an angle obtained by adding an angle θ40 of the thread 400, which is an angle formed between the first surface 411 and the second surface 412, the first angle θ41 and the second angle θ42 is 180 degrees. The magnitude of the angle θ40 is smaller than the magnitude of the angle θ20.

In the supply device including the screw 286 and the nut 87 according to the second embodiment configured as described above, the first surface 411 of the screw 286 and the second surface 312 of the nut 87 are in contact with each other, and a gap between the second surface 412 and the first surface 311, which is formed due to non-contact between the second surface 412 of the screw 286 and the first surface 311 of the nut 87, is larger than the gap S1. As a result, it is more difficult for abrasion powders or debris to get caught between the thread 400 of the male screw 86d and the thread 300 of the female screw 87a, so that occurrence of sticking and occurrence of chipping of the thread 400 or the thread 300 are further suppressed.

Third Embodiment

Figure 9:
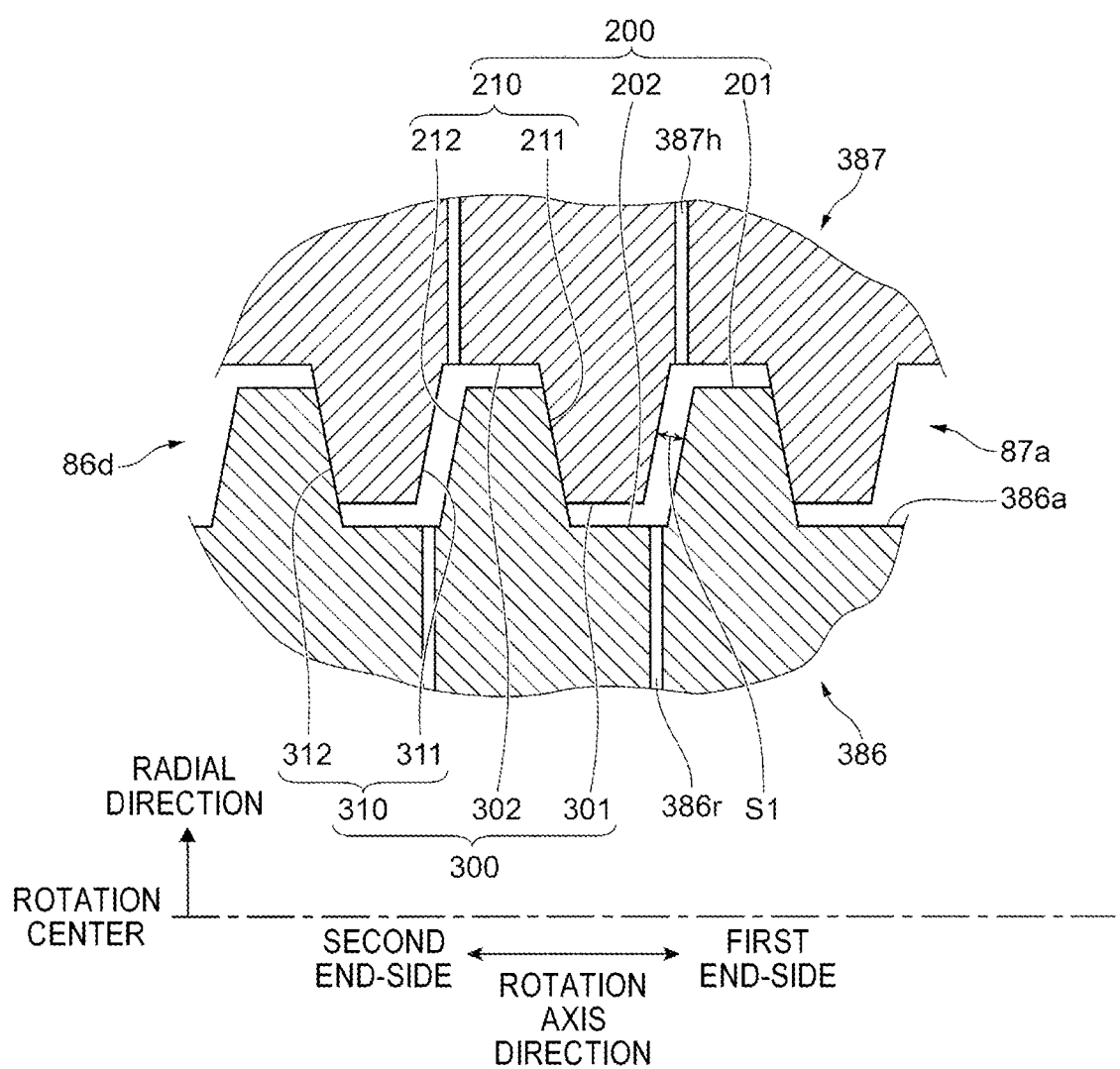
FIG. 9 shows an example of a meshing portion between a male screw 86d of a screw 386 and a female screw 87a of a nut 387 according to a third embodiment.

FIG. 9 shows an example of a meshing portion between a male screw 86d of a screw 386 and a female screw 87a of a nut 387 according to a third embodiment.

The screw 386 according to the third embodiment is different from the screw 86 of the first embodiment, in that a concave portion 386r extending in a radial direction of rotation is formed on an inner side of the male screw 86d in the radial direction of rotation. In addition, the screw 387 according to the third embodiment is different from the screw 87 of the first embodiment, in that a through-hole 387h extending in the radial direction of rotation is formed on an outer side of the female screw 87a in the radial direction of rotation. In the below, differences from the first embodiment are described. In the first embodiment and the third embodiment, the same parts are denoted with the same reference signs, and the detailed descriptions thereof are omitted.

The concave portion 386r formed in the screw 386 is concave in the radial direction of rotation, in other words, in the direction orthogonal to the axis direction from an outer peripheral surface of a first portion 386a on which the male screw 86d is formed. For example, it may be exemplified that the concave portion 386r is concave from the outer peripheral surface of the first portion 386a to a center of rotation. A position of the concave portion 386r in the axis direction is preferably a position of each bottom surface 202 closer to the second surface 212 than a center in the axis direction. More preferably, as shown in FIG. 9, the position of the concave portion 386r in the axis direction is a position overlapping a position in the axis direction of the gap S1 formed between the second surface 212 of the screw 386 and the first surface 311 of the nut 387. It may be exemplified that the concave portion 386r has a circular cylinder-shape. In the present embodiment, a diameter of the concave portion 386r may be, for example, 10% or more of the length of the top surface 201 in the axis direction, and may be equal to or larger than a width of the gap S1 in the axis direction. The number of the concave portions 386r in the circumferential direction of the screw 386 is not particularly limited. The number of the concave portions 386r in the circumferential direction may be any number of 1 or more.

The through-hole 387h formed in the nut 387 is formed to communicate an inner side of the nut 387 in the radial direction and an outside of the nut 387. A position of the through-hole 387h in the axis direction is preferably a position of each valley surface 302 closer to the first surface 311 than a center in the axis direction. More preferably, as shown in FIG. 9, the position of the through-hole 387h in the axis direction is a position overlapping the position of the gap S1 in the axis direction. It may be exemplified that the through-hole 387h has a circular cylinder-shape. In the present embodiment, a diameter of the through-hole 387h may be, for example, 10% or more of the length of the top surface 301 in the axis direction, and may be equal to or larger than the width of the gap S1 in the axis direction. The number of the through-holes 387h in the circumferential direction of the nut 387 is not particularly limited. The number of the through-holes 387h in the circumferential direction may be any number of 1 or more.

As described above, the supply device including the screw 386 and the nut 387 according to the third embodiment has the concave portion 386r, as an example of the communication passage configured to communicate with the portion (gap S1) between the second surface 212, which forms the thread 200 of the male screw 86d, and the first surface 311, which forms the thread 300 of the female screw 87a, on a more inner side in the radial direction of rotation than the male screw 86d. For this reason, abrasion powders or debris generated from an end portion on the first surface 211-side of the top surface 201 of the thread 200 of the male screw 86d may enter the concave portion 386r of the screw 386. In addition, the nut 387 has the through-hole 387h, as an example of the communication passage configured to communicate with the portion (gap S1) between the second surface 212, which forms the thread 200 of the male screw 87a, and the first surface 311, which forms the thread 300 of the female screw 87a, on a more outer side in the radial direction than the female screw 87a. For this reason, the abrasion powders or debris may be discharged to the outside of the nut 387 via the through-hole 387h. As a result, it is more difficult for abrasion powders or debris to get caught between the male screw 86d and the female screw 87a, so that occurrence of sticking between the screws and occurrence of chipping of the thread 200 or the thread 300 are suppressed.

In the above descriptions, the concave portion 386r and the through-hole 387h, each of which has a circular cylinder-shape, have been exemplified. However, the shapes of the concave portion 386r and the through-hole 387h are not limited to the circular cylinder-shape.

Further, in the above descriptions, the concave portion 386r and the through-hole 387h extending in the radial direction of rotation have been exemplified. However, the concave portion 386r and the through-hole 387h may not extend in the radial direction of rotation. The concave portion 386r and the through-hole 387h may be formed in a direction intersecting with the axis direction, and an angle with respect to the axis direction is not particularly limited.

Further, in the above descriptions, the through-hole 387h in a form of penetrating through the nut 387 in the radial direction has been exemplified. However, when the moving member has a communication passage, the communication passage may not be a through-hole, and may be a concave portion concave from the inner peripheral surface.

Further, in the above descriptions, the form in which the concave portion 386r is formed in each bottom surface 202 has been exemplified. However, when the rotation member has a communication passage, the communication passage may not be formed in all the bottom surfaces 202, and may be formed in one or more bottom surfaces selected from the plurality of bottom surfaces 202. Further, in the above descriptions, the form in which the through-hole 387h is formed in each bottom surface 302 has been exemplified. However, when the movable member has a communication passage, the communication passage may not be formed in all the bottom surfaces 302, and may be formed in one or more bottom surfaces selected from the plurality of bottom surfaces 302.

Further, in the above descriptions, the form in which the rotation member and the moving member have the communication passages (the concave portion 386r, the through-hole 387h) has been exemplified. However, the present embodiment is not limited to the form, and either the concave portion 386r or the through-hole 387h may be provided.

Further, in the above descriptions, the third embodiment corresponding to the form in which the rotation member and the moving member of the first embodiment are provided with the communication passages has been exemplified. However, the third embodiment is not limited thereto. In a case where the rotation member and the moving member are provided with communication holes, the concave portion 386r and the through-hole 387h may be applied to the male screw 286d of the screw 286 and the female screw 87a of the nut 87 according to the second embodiment.

The invention claimed is:
1. A fluid supply device comprising:
a rotation member having a male screw formed thereon and configured to rotate; and
a moving member having a female screw formed thereon in mesh with the male screw, and configured to move toward a first end-side in a rotation axis direction of the rotation member as the rotation member rotates in a first direction that is a circumferential direction, to drive, by this movement, a piston configured to form a reservoir chamber, and to discharge a fluid stored in the reservoir chamber,
wherein, at least, when the fluid is discharged or when the rotation member is not rotating, a surface on the first end-side, which forms a thread of the male screw, and a surface on a second end-side, which forms a thread of the female screw, are in contact with each other, and a surface on the second end-side, which forms the thread of the male screw, and a surface on the first end-side, which forms the thread of the female screw, are not in contact with each other.

2. The fluid supply device according to claim 1, wherein the male screw and the female screw are trapezoidal screws.

3. The fluid supply device according to claim 1, wherein a magnitude of an angle formed between the surface on the second end-side, which forms the thread of the male screw, and the rotation axis direction is smaller than a magnitude of an angle formed between the surface on the first end-side, which forms the thread of the female screw, and the rotation axis direction.

4. The fluid supply device according to claim 1, wherein the rotation member has a communication passage configured to communicate with a portion positioned between the surface on the second end-side, which forms the thread of the male screw, and the surface on the first end-side, which forms the thread of the female screw, and provided on a more inner side in a radial direction of rotation of the rotation member than the male screw.

5. The fluid supply device according to claim 1, wherein the moving member has a communication passage configured to communicate with a portion positioned between the surface on the second end-side, which forms the thread of the male screw, and the surface on the first end-side, which forms the thread of the female screw, and provided on a more outer side in a radial direction of rotation of the rotation member than the female screw.

6. A vehicle height adjustment device comprising:
the fluid supply device according to claim 1; and
a spring whose load is adjusted using the fluid supplied by the fluid supply device.

7. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
a vehicle height adjustment device configured to adjust a load of the spring of the second suspension device by using the fluid supplied by the fluid supply device according to claim 1.

8. The fluid supply device according to claim 2, wherein a magnitude of an angle formed between the surface on the second end-side, which forms the thread of the male screw, and the rotation axis direction is smaller than a magnitude of an angle formed between the surface on the first end-side, which forms the thread of the female screw, and the rotation axis direction.

9. The fluid supply device according to claim 2, wherein the rotation member has a communication passage configured to communicate with a portion positioned between the surface on the second end-side, which forms the thread of the male screw, and the surface on the first end-side, which forms the thread of the female screw, and provided on a more inner side in a radial direction of rotation of the rotation member than the male screw.

10. The fluid supply device according to claim 2, wherein the moving member has a communication passage configured to communicate with a portion positioned between the surface on the second end-side, which forms the thread of the male screw, and the surface on the first end-side, which forms the thread of the female screw, and provided on a more outer side in a radial direction of rotation of the rotation member than the female screw.

11. A vehicle height adjustment device comprising:
the fluid supply device according to claim 2; and
a spring whose load is adjusted using the fluid supplied by the fluid supply device.

12. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
a vehicle height adjustment device configured to adjust a load of the spring of the second suspension device by using the fluid supplied by the fluid supply device according to claim 2.

13. The fluid supply device according to claim 3, wherein the rotation member has a communication passage configured to communicate with a portion positioned between the surface on the second end-side, which forms the thread of the male screw, and the surface on the first end-side, which forms the thread of the female screw, and provided on a more inner side in a radial direction of rotation of the rotation member than the male screw.

14. The fluid supply device according to claim 3, wherein the moving member has a communication passage configured to communicate with a portion positioned between the surface on the second end-side, which forms the thread of the male screw, and the surface on the first end-side, which forms the thread of the female screw, and provided on a more outer side in a radial direction of rotation of the rotation member than the female screw.

15. A vehicle height adjustment device comprising:
the fluid supply device according to claim 3; and
a spring whose load is adjusted using the fluid supplied by the fluid supply device.

16. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and
a vehicle height adjustment device configured to adjust a load of the spring of the second suspension device by using the fluid supplied by the fluid supply device according to claim 3.

17. The fluid supply device according to claim 4, wherein the moving member has a communication passage configured to communicate with a portion positioned between the surface on the second end-side, which forms the thread of the male screw, and the surface on the first end-side, which forms the thread of the female screw, and provided on a more outer side in a radial direction of rotation of the rotation member than the female screw.

18. A vehicle height adjustment device comprising:
the fluid supply device according to claim 4; and
a spring whose load is adjusted using the fluid supplied by the fluid supply device.

19. A saddle-type vehicle comprising:
a vehicle main body;
a front wheel arranged on a front side of the vehicle main body and a rear wheel arranged on a rear side of the vehicle main body;
a first suspension device arranged between the vehicle main body and the front wheel;
a second suspension device arranged between the vehicle main body and the rear wheel and having a spring; and a vehicle height adjustment device configured to adjust a load of the spring of the second suspension device by using the fluid supplied by the fluid supply device according to claim 4.

20. A vehicle height adjustment device comprising:
the fluid supply device according to claim 5; and
a spring whose load is adjusted using the fluid supplied by the fluid supply device.

\* \* \* \* \*